Sept. 4, 1956 W. K. ROBBINS 2,761,275
CONNECTING LINKS FOR CHAINS AND THE LIKE WITH
TWO PART WEDGING TYPE LIMB BRACING MEANS
Filed Jan. 17, 1951 2 Sheets-Sheet 1
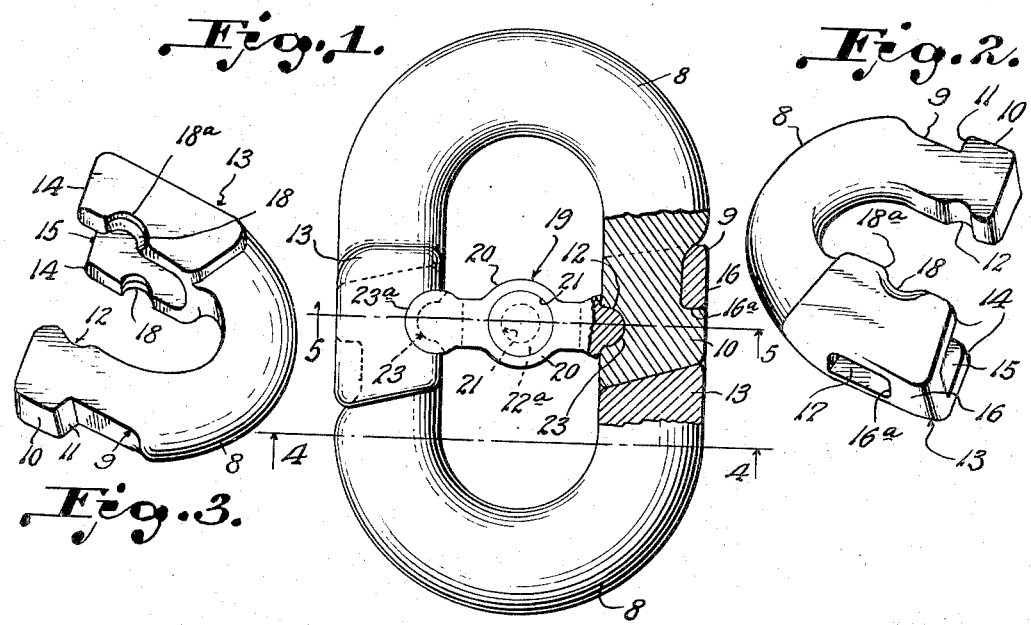
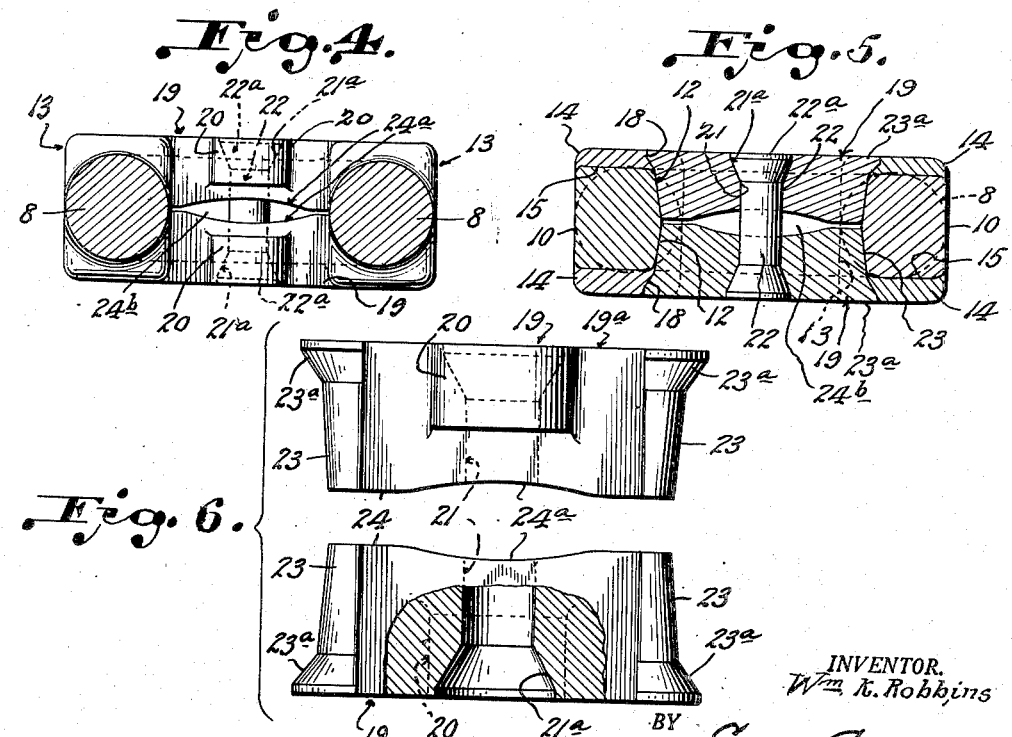
INVENTOR.
W<sup>m</sup> K. Robbins
BY Eugene E. Stevens
ATTORNEY.

Sept. 4, 1956 W. K. ROBBINS 2,761,275
CONNECTING LINKS FOR CHAINS AND THE LIKE WITH
TWO PART WEDGING TYPE LIMB BRACING MEANS
Filed Jan. 17, 1951 2 Sheets-Sheet 2
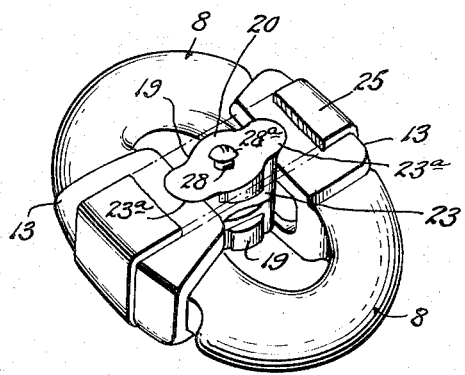
Fig. 7.
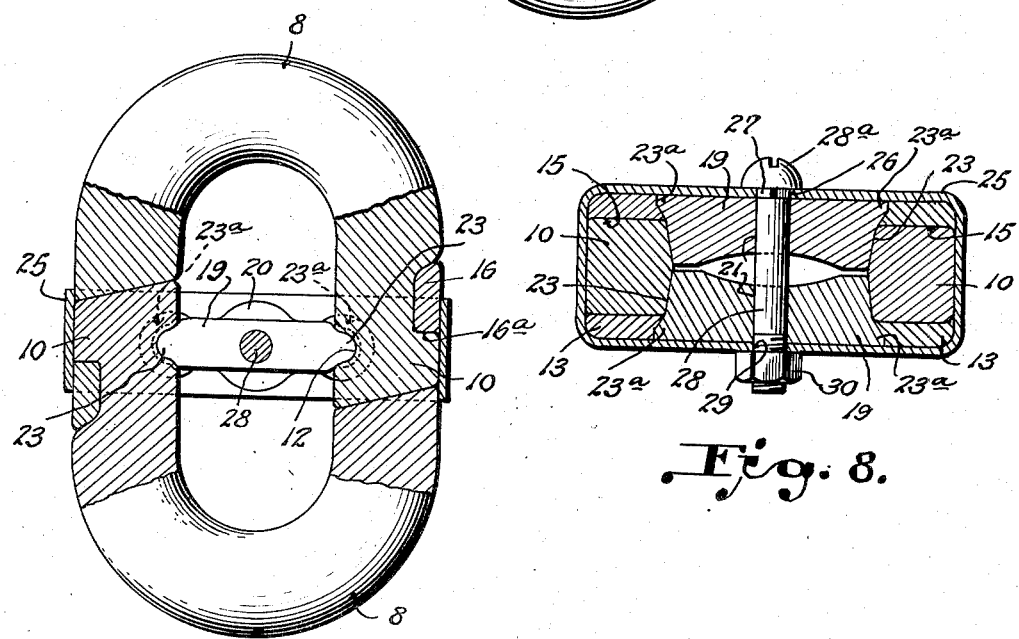
Fig. 9.
Fig. 8.
INVENTOR.
Wm K. Robbins
BY Eugene E. Stevens
ATTORNEY.

United States Patent Office 2,761,275
Patented Sept. 4, 1956

2,761,275

CONNECTING LINKS FOR CHAINS AND THE LIKE WITH TWO PART WEDGING TYPE LIMB BRACING MEANS

William Kalleen Robbins, Milwaukee, Wis.

Application January 17, 1951, Serial No. 206,444

3 Claims. (Cl. 59—85)

My invention relates to improvements in chain links or the like with particular reference to reinforcing means therefor, and while undoubtedly the greatest commercial utility for my present advance in the art will be in the separable section connecting or repair link field, it is not to be understood as limited thereto.

As in my Patent No. 2,525,724, dated October 10, 1950 (application filed October 10, 1945), my present improvement provides a detachable abutment means for sustaining the opposed limbs of a chain link or the like in service. Also, as illustrated herein and in my earlier application referred to, said abutment means makes rockable bearing contact between the interlocked halves of a chain-connecting link to prevent separation of said halves and also to sustain opposite limbs of the link when they tend to approach one another as the result of eccentric bending at their ends under heavy lineal loads. When excessive lineal load is applied to a separable section link the sides or limbs of same tend to lengthen different degrees, and if the interposed abutment member does not have a rocking engagement with the inner surfaces of the limbs at the joint, it will give way and become ineffective as a support for the link limbs.

The present invention has for a primary object to provide in a separable section or other link a two-part abutment or reinforcing member which can be readily assembled in the field without requiring any tools other than a hammer or a wrench. Since the abutment parts can be held in assembly by bolting rather than riveting, the device is especially suited for separable section links used for drag line bucket service, buoy mooring, and other types of service where links have to be changed frequently and when time is frequently of the essence.

The invention also contemplates a chain link reinforcing means in the form of a two-part, wedge-form abutment member, the parts being adapted to be driven into position with a hammer from opposite sides of the link so as to insure a tight fit even though the abutment member has been driven in and removed several times. Furthermore, the two-part abutment member, whether wedge shaped or otherwise, lends itself to employment where the link joint-provided seats are out of line or make a poor fit, and is especially suitable for large sized heavy duty links because the abutment member parts can be case hardened for greater strength. This is not possible as to the one piece abutment of my Patent No. 2,525,724, as ends thereof have to be peened over to retain it in place.

Other objects and advantages of the present invention will be readily apparent to those versed in the art from a reading of the following description in connection with the accompanying drawings illustrating the now preferred form of my inventive concept.

It is to be understood, however, that the illustrated embodiment of the invention is susceptible of considerable change and modification within the spirit and scope of the subject matter claimed hereinafter.

In the drawings, wherein the same reference characters have been used to designate the same parts wherever they appear throughout the several views—

Fig. 1 is a plan view of a separable section connecting link embodying my improvements;

Fig. 2 is a perspective view of one of the link halves;

Fig. 3 is a similar view, but taken from the opposite side of the link section or half shown in Fig. 2;

Fig. 4 is a cross-sectional view taken on the line 4—4 of Fig. 1;

Fig. 5 is a cross-sectional view taken on the line 5—5 of Fig. 1;

Fig. 6 is a group side elevational view of the two abutment members, a part of one being broken and shown in section;

Fig. 7 is a perspective view of the link of Fig. 1 with the abutment members in place and showing a band-like confining member for said abutment members;

Fig. 8 is a cross-sectional view taken on the line 8—8 of Fig. 7;

Fig. 9 is a plan view of the link of Fig. 8 with parts broken away and shown in section.

Referring to the drawings by reference characters, the duplicate link halves are denoted by numeral 8 and Figs. 2 and 3 show that each of same has the exterior cut-out or seat 9 inwardly of the outer end of one limb so as to provide the outwardly projecting lug 10 having the inner shoulder 11.

The inner end surface of the lug 10 has the transverse rounded groove 12 as shown in Figs. 2 and 3, which extends the full thickness of said lug and tapers or inclines outwardly from its mid point (see Fig. 5).

The other limb of each link half terminates in the socket member generally designated by reference character 13. This socket member 13 provides the spaced parallel walls 14 defining the socket recess 15 which is open at its outer end and is adapted to receive the stud portion 10 and adjacent seat portion 9 of the other link half 8.

Fig. 2 indicates that the socket portion 13 of each link half has a bridge wall 16 connecting the parallel walls 14 at the outer edges of the latter adjacent the open end of socket recess 15. This bridge wall 16 extends over a considerable portion of socket recess 15 inwardly of its open end, and the inner end of bridge wall 16 provides the shoulder 16a forming the outer end of a stud-receiving hole 17 which is formed in the outer side of the socket portion 13.

The broken and sectioned portion of Fig. 1 shows how the stud member 10 of one link section 8 fits in the socket recess 15 of the other link section and seats in the hole 17 thereof. In the assembly shown in Fig. 1 the stud shoulder 11 of one link half makes bearing contact with the shoulder 16a at the inner edge of the bridge member 16 of the other member's socket portion 13 to sustain the lineal load on the link in service.

Figs. 2 and 3 show that the spaced parallel walls 14 of the socket portion 13 of each member 8 have aligned curved inner edge recesses 18 which, when the link halves are assembled as in Fig. 1, are in alignment with the respective outwardly tapered portions of the inner edge groove 12 at the back of the stud portion 10 of the other link member. This arrangement is also illustrated in Fig. 5 which discloses the opposed abutment members 19 in place, such abutment members being illustrated in Fig. 6.

Each of the abutment members 19, as shown in Figs. 1 and 6, have medial thickened portions 20 adjacent their outer edges and projecting beyond the plane of each side. These medial thickened portions 20 have holes 21 extending depth-wise through the abutment member. When the abutment members are assembled, as in Figs. 1 and 5, these holes 21 will be in alignment for the reception of a rivet, bolt or the like 22. The outer ends of the holes 21 are beveled to increased diameter (21a) to receive the heads 22a of the rivets 22 when used.

The outer ends of each abutment member 19 are rounded as indicated at 23 in Figs. 1 and 6, and Fig. 6 indicates that the rounded outer ends 23 of the abutment members 19 taper inwardly in the direction of their inner longitudinal edge 24. The outer ends of the rounded terminals of the abutment members 19 are flared outwardly to provide half heads as indicated at 23a, these half heads being adapted to seat in the tapered outer ends 18a of the rounded grooves 18 in the inner edges of the parallel wall portions 14 of the socket members 13.

By preference, the inner edges 24 of each of the abutment members 20 will have their intermediate portions curved inwardly slightly as indicated at 24a to provide a relief area 24b (see Fig. 4) and also to avoid possibility of the members 19 engaging one another when driven in place so as to prevent a tight wedging action with the grooves 12, 18 of the link halves from being achieved.

It is to be noted from Fig. 5 that the length of the wedge form abutment members 19 from narrowed inner end to widened outer end is less than half the thickness of the link at the joint 10, 13. Thus, a tight fit of each abutment member 19 is always obtainable even though it has been used over and over again.

The assembly of the parts will now be referred to. The link halves 8 are slid into the interengaged position illustrated in Fig. 1. Then first one abutment member 19 is driven into place, whereupon the link is inverted and the other abutment member 19 is driven in place. Now the rivet or bolt 22 is applied and secured either by riveting or by the application of a nut.

Referring now to the modified form of the invention shown in Figs. 7, 8 and 9, it embodies the structure illustrated in Figs. 1–6, inclusive, plus the addition of a metal band 25 which encompasses the assembled link at the joint, as shown in Fig. 7, and overlies the abutment members 19. The band 25 as shown in Fig. 8 will have a medially positioned square hole 26 at one side to receive the squared portion 27 of the bolt head 28a. The opposite side of the band 25 has an aligned hole 29, both holes 26, 29 of the band 25 lining up with the holes 21 in the abutment members for the passage of the bolt 28. The other end of the bolt is threaded to receive the nut 30 as shown. The band 25 is useful because when it is slipped in place as shown in Fig. 7 it will retain the abutment members 19 in position even though they do not make a tight fit. And also the band 25 assures maintenance of the abutment members 19 in position while the bolt is being put into position and the nut 30 applied thereto. Further, the securing means 28 (Fig. 8) has a dual function in that it secures both the band 25 and abutment members 19 in place.

As in my patent, referred to earlier herein the limbs of the link halves 8 tend to lengthen different degrees when under extreme lineal stress. When this happens the twin abutment members 19 simply rock in the bearings 12, 18 (see Fig. 5) to admit of this different limb lengthening action taking place. The material of which the abutment members 19 are made, although it may and preferably will be case hardened, is not as hard as the case hardened material of the link halves 8. Thus the shoulders at opposite sides of the rounded ends 23 of the abutment members will be indented slightly by this different limb lengthening action to admit of the described rocking of the abutment members 19.

It is to be noted that the two-part abutment member 19, 19 of my present invention is especially advantageous for large sized heavy duty links because such abutment member elements 19 can be case hardened for greater strength. This is not possible with the one piece link limb-spanning abutment of my Patent No. 2,525,724 which must be of malleable material so that ends thereof can be peened over to retain it in place.

Referring to Figs. 4, 5 and 8, it will be noted that the space 24b between the inner ends of the members 19 admits of entry of a cold chisel or wedge element to be driven in to separate the members 19, as for instance when the link sections 8 are to be disconnected.

Furthermore, the half heads 23a at the ends of the abutment members 19 limit insertion of same so as to avoid bringing the inner end portions 24 of said members into contact with one another.

It will be obvious that the taper of the end portions 23 of the abutment members 19 may be varied and the same as to the taper of the grooves 12, 18 in the head portions 10 and wall portions 14, respectively.

Having thus described my invention, what I claim is:

1. In a chain link or the like having spaced limbs, limb bracing means comprising two opposed and hammer driveable wedge form abutment members disposed in aligned opposition to one another and assembled from opposite sides of the link, the length of each of said wedge members being less than half of the thickness of the link limbs, the link-limb-engaging sides of each abutment member providing transversely arcuate bearing portions which taper inwardly in a substantially straight line, the opposed inner surface portions of said link limbs each having aligned transversely extending and transversely rounded bearing recesses tapering to decreased depth from opposite longitudinal edges of said limb to a point at least adjacent the mid-thickness point thereof, corresponding ones of said opposed limb recesses receiving the arcuate end bearing portions of different ones of said abutment members and substantially conforming in taper thereto, link-limb-engaging stop portions carried by the outer end of each abutment member whereby to prevent the inner ends of said wedge form abutment members from being driven into engagement with one another so as to assure of the leaving of a tool-receiving space between the inner ends of said abutment members to facilitate removal of said members, and removable means engaging said abutment members to retain same in place.

2. In a chain link or the like having spaced limbs, limb bracing means comprising two opposed and hammer driveable wedge form abutment members disposed in aligned opposition to one another and assembled from opposite sides of the link, the length of each of said wedge members being less than half of the thickness of the link limbs, the link-limb-engaging sides of each abutment member providing transversely arcuate bearing portions which taper inwardly in a substantially straight line, the opposed inner surface portions of said link limbs each having aligned transversely extending and transversely rounded bearing recesses tapering to decreased depth from opposite longitudinal edges of said limb to a point at least adjacent the mid-thickness point thereof, corresponding ones of said opposed limb recesses receiving the arcuate end bearing portions of different ones of said abutment members and substantially conforming in taper thereto, the inner ends of said abutment members having opposed cutouts which cooperate to provide a tool receiving recess for use when the abutment members are to be removed, link-limb-engaging stop portions carried by the outer end of each abutment member whereby to prevent them from being driven into engagement with one another, and removable means engaging said abutment members to retain same in place.

3. In a chain link or the like having spaced limbs, limb bracing means comprising two opposed and hammer driveable wedge form abutment members disposed in aligned opposition to one another and assembled from opposite sides of the link, the link-limb-engaging sides of each abutment member providing transversely arcuate bearing portions which taper inwardly in a substantially straight line, the opposed inner surface portions of said link limbs each having aligned transversely extending and transversely rounded bearing recesses tapering to decreased depth from opposite longitudinal edges of said limb to a point at least adjacent the mid-thickness point thereof, corresponding ones of said opposed limb recesses receiving the arcuate end bearing portions of different ones of said abutment members and substantially conforming in taper thereto, the inner ends of said abutment members having opposed cutouts which cooperate to provide a tool receiving recess for use when the abutment members are to be removed, link-limb-engaging stop portions carried by the outer end of each abutment member whereby to prevent the inner ends of said wedge form abutment members from being driven into engagement with one another, and removable means engaging said abutment members to retain same in place.

References Cited in the file of this patent

UNITED STATES PATENTS

| | | |
|---|---|---|
| 247,952 | Schneider | Oct. 4, 1881 |
| 785,881 | Hill | Mar. 28, 1905 |
| 859,082 | Kenter | July 2, 1907 |
| 1,412,919 | Campbell | Apr. 18, 1922 |
| 2,525,724 | Robbins | Oct. 10, 1950 |

FOREIGN PATENTS

| | | |
|---|---|---|
| 571,185 | Great Britain | Aug. 10, 1945 |